Oct. 29, 1963     T. B. HARPER     3,108,832
KNOTTER MECHANISMS

Filed May 4, 1961     4 Sheets-Sheet 1

INVENTOR.
TOBY B. HARPER
BY Head & Johnson
ATTORNEYS

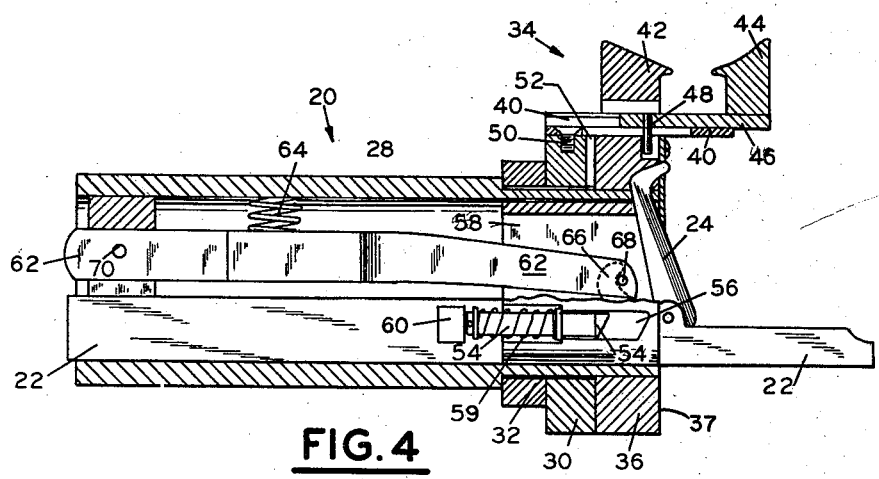
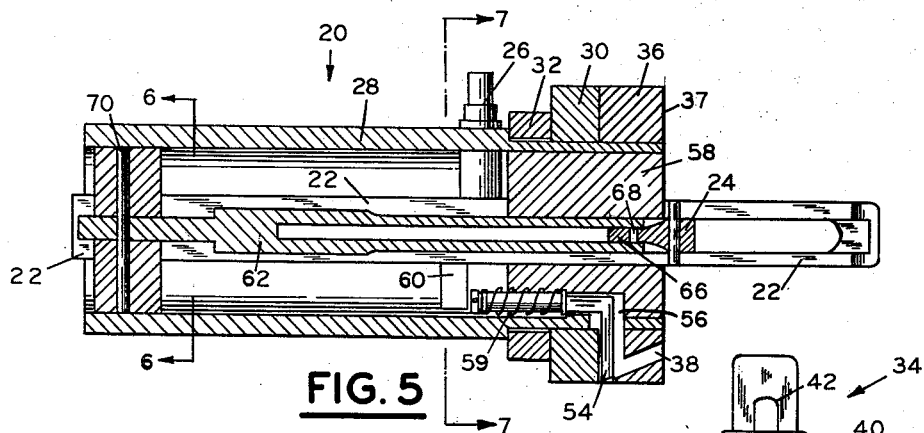
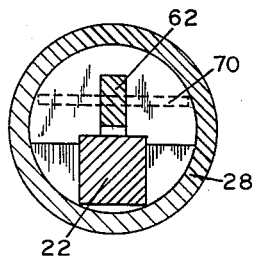
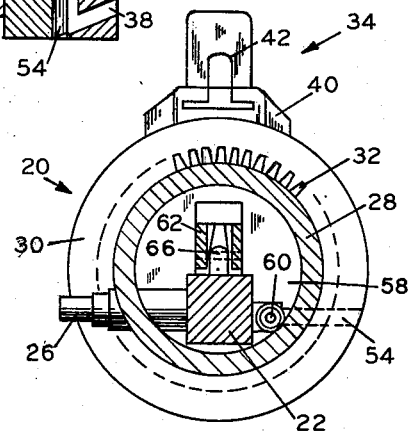

Oct. 29, 1963   T. B. HARPER   3,108,832
KNOTTER MECHANISMS
Filed May 4, 1961   4 Sheets-Sheet 3

INVENTOR.
TOBY B. HARPER
BY Head & Johnson
ATTORNEYS

*INVENTOR.*
TOBY B. HARPER
BY
ATTORNEYS

# United States Patent Office 3,108,832
Patented Oct. 29, 1963

3,108,832
KNOTTER MECHANISMS
Toby B. Harper, Dolph, Ark.
Filed May 4, 1961, Ser. No. 107,829
5 Claims. (Cl. 289—12)

This invention relates to improvements in knotter mechanisms. More particularly, the invention relates to improvements in knotter mechanisms adaptable for use on hay balers and the like. This invention in addition relates to improvements in the knot tying mechanism described in my co-pending application, S.N. 852,510, filed November 12, 1959, entitled Knotter Mechanism.

In my co-pending application, S.N. 852,510, I have described a new and novel method of forming knots in twine and have further described devices adaptable to practice the method to automatically tie a knot as utilized in hay balers. This invention discloses improvements in the knot tying devices of my aforementioned knotter mechanism.

It is therefore an object of this invention to provide a knot tying mechanism having improved operability, compactness of design and economy of construction.

Another object of this invention is to provide a knot tying mechanism having an improved threader member adaptable for positive action in guiding the twine during the knot tying process.

Another object of this invention is to disclose an improved twine holder adaptable to hold the twine during the knot tying process.

Another object of this invention is to provide a new and novel twine cutter for use with knot tying devices.

These and other objects and a better understanding of the invention may be had by referring to the following descriptions and claims taken in conjunction with the attached drawings in which:

FIGURE 4 is a cross-sectional view taken along the line 4—4 of FIGURE 2 of the improved knot tying device of this invention.

FIGURE 5 is a cross-sectional view taken along the line 5—5 of FIGURE 1 of the improved knot tying device of this invention.

FIGURE 6 is a cross-sectional view taken along the line 6—6 of FIGURE 5.

FIGURE 7 is a cross-sectional view taken along the line 7—7 of FIGURE 5.

This invention may be described as a knot tying device. More particularly, but not by way of limitation, this invention may be described as a device for knotting twine comprising a knot base housing having a substantially perpendicular face at one end having an opening therein; a knot base member reciprocally positioned in said opening in said knot base housing; a knot hook pivotally affixed to said knot base member adaptable to pivot in closed relationship with said knot base member as said knot base member is withdrawn within said knot base housing; a threader member adaptable to rotate about said knot base housing, said threader member having jaws movable with respect to each other, said jaws extending substantially parallel to said knot base member and said jaws adaptable to grasp said twine; and means of closing and opening said jaws of said threader member as said threader member rotates about said knot base housing in sequential relationship to the reciprocal movement of said knot base member.

Figure 1:
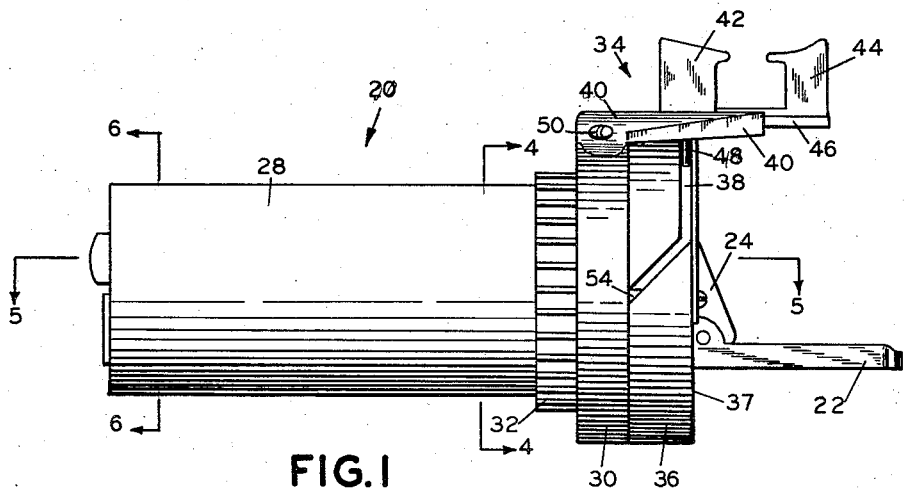
FIGURE 1 is a side view of the improved knot tying device of this invention.

Referring now to the drawings and first to FIGURE 1, the knot tying device of the invention is indicated generally by the numeral 20. A knot base member 22, having a knot hook 24 pivoted thereon, is slideably actuated by cam follower 26. Knot base member 22 slides within knot base housing 28 during the formation of a knot. Cam follower 26, shown in FIGURE 2, extends through a slot (not shown) in the cylindrical knot base housing 28 whereby the reciprocal movement of knot base member 22 is produced by the effect of a cam (not shown).

A threader collar 30, having threader gear 32 integrally affixed thereto, is rotatably supported to knot base housing 28. Affixed to threader collar 30 and extending substantially parallel to the tubular axis of knot base housing 28 is a threader member generally indicated by the numeral 34. The function of threader member 34 is to grasp twine being tied and wind it about knot hook 24 and knot base member 22. This invention primarily relates to the improved functioning of threader member 34.

Figure 3:
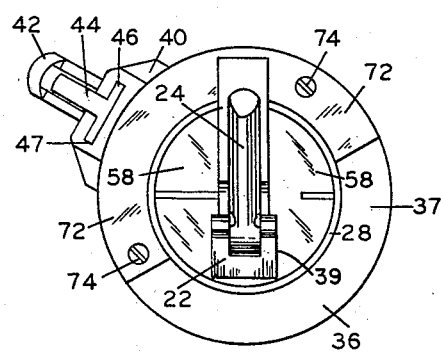
FIGURE 3 is an end view of the improved knot tying device of this invention.

Affixed to the forward end of knot base housing 28 is a threader cam head 36. Threader cam head 36 may be independently formed and securely affixed to knot base housing 28, as shown in the drawings, or may be integrally formed with knot base housing 28. Threader cam head 36 terminates in a substantially perpendicular face 37. A groove 38 in threader cam head 36 serves to actuate threader member 34 as threader collar 30 is rotated about knot base housing 28. An opening 39 (see FIGURE 3) in the face 37 of cam head 36 slideably receives the knot base member 22 into knot base housing 28.

Threader member 34 consists of a threader base 40 extending out substantially parallel to knot base member 22, a fixed threader jaw 42 and a movable threader jaw 44. Movable threader jaw 44 is supported to a base 46 which slides within a groove 47 in threader base 40. A pin 48, see FIGURE 4, extends from movable jaw base 46 to protrude within groove 38 of threader cam head 36. Thus, as threader member 34 is rotated around knot base housing 28, the position of movable threader jaw 44 relative to fixed threader jaw 42 is determined by the action of pin 48 in groove 38.

Threader base 40 may be supported to threader collar 30 by screws 50, or may be welded or integrally formed with threader collar 30.

Figure 2:
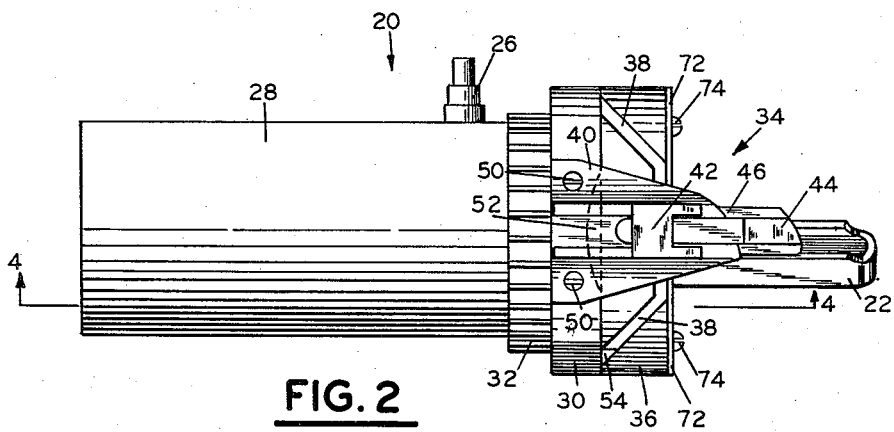
FIGURE 2 is a top view of the improved knot tying device of this invention.
Figure 2A:
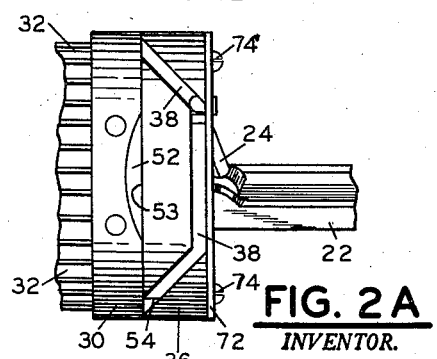
FIGURE 2A is a top view of the improved knot tying device of this invention with the threader member removed.

FIGURE 2A discloses a portion of the view of FIGURE 2 of the knot tying device 20 of the knotter mechanism of this invention with threader base 40 removed. With threader base 40 removed, it will be noted that an arcuate recess groove 52 is formed in threader collar 30 so that pin 48 is trapped in recess groove 52 by the rearward vertical side 53 of threader cam head 36 except when pin 48 moves into groove 38. Pin 48 will remain in recess groove 52, and be thereby encompassed between the recess groove 52 and threader cam head 36, at all times except when in groove 38. During the rotation of threader collar 30, movable threader jaw 44 will remain in closed engagement with fixed threader jaw 42 at all times except when movable threader jaw 44 is moved forward when pin 48 enters groove 38. The rest position of the knot mechanism of this invention is as shown in FIGURES 1, 2 and 4 wherein the pin 48 is in groove 38 and the movable threader jaw 44 moved away from fixed threader jaw 42 ready to receive twine between the jaw members to initiate the tying process.

The knot tying method utilized by this invention, which will be described in detail subsequently, requires that the threader member 34 make two revolutions about knot base housing 28 in the process of tying each knot. The threader member 34 starts the knot tying procedure in the attitude shown in FIGURE 1, wherein movable jaw 44 is displaced away from fixed jaw 42 to receive the twine to be tied. After the twine to be tied is laid in the opening between movable jaw 44 and fixed jaw 42, threader collar 30 starts to rotate by force applied through gear 32, moving threader member 34. As threader member 34 moves with respect to threader cam head 36 having groove 38 therein, pin 48 is forced by the effect of groove 38 to move movable jaw 44 inwardly, grasping the twine between the movable jaw 44 and the fixed jaw 42. As the threader collar 30 continues to rotate, pin 48 is maintained within the recess groove 52.

Pin 48 must stay in recess groove 52 during approximately 700° of rotation so that a method must be provided to guide pin 48 into groove 38 during the second rotation of threader collar 30. To accomplish this, a groove guide member 54 is provided. Groove guide member 54 may best be seen in FIGURES 4 and 5. A slot 56 is provided in a guide member 58 which closes the forward end of knot base housing 28. Groove guide member 54 is of an L-shaped configuration having the forward portion extending substantially perpendicularly to the knot base member 22. The forward portion of the groove guide member 54 has a cross-sectional configuration substantially of a right triangle and extends at all times within the entrance to groove 38 in threader cam head 36, except when withdrawn within recess groove 52. A spring 58 applies resilient pressure between the groove guide member 54 and guide member 57, always urging the groove guide member 54 rearward. Thus, when threader collar 30 is rotated so that recess groove 52 coincides with groove guide member 54, groove guide member 54 will retract within recess groove 52 by action of spring 58, unless otherwise prevented.

Affixed to knot base member 22 within knot base housing 28 is a guide stop 60. As previously mentioned, the action of spring 58 will tend to retract groove guide member 54 rearwardly and into the recess groove 52 each time groove 52 aligns with the groove guide member 54. When the knot base member 22, however, is in its maximum forward position, guide stop 60 abuts against the rearward end of groove guide member 54. In this position, even though groove guide member 54 aligns with recess groove 52, the groove guide member 54 is prevented from entering recess groove 52 by guide stop 60.

As can be seen in FIGURE 2, as threader collar 30 rotates, groove guide member 54 will retract when the recess groove 52 aligns with it. The retraction of groove guide member 54 into recess groove 52 causes, due to the triangular configuration of groove guide member 54, pin 48 to be moved forwardly to enter groove 38. Thus, on each revolution of threader collar 30, pin 48 will be caused to enter groove 38 to move movable jaw 44 forward while in groove 38 unless groove guide member 54 is held in a forward position by guide stop 60. As previously mentioned, the knot tying method of this invention requires that on one revolution, which occurs when the knot base member 22 is in its maximum forward position, it is necessary that the movable threader jaw 44 not open with respect to fixed threader jaw 42 so that the twine being tied is not released. This is accomplished by the effect of guide stop 60. When guide stop 60 rests against the rearward end of groove guide member 54, the groove guide member 54 will not be withdrawn within the recess groove 52 and thus pin 48 will not enter into groove 38.

Knot base member 22 slides forwardly and rearwardly during the process of tying a knot in the twine by the action of cam follower 26. Pivoted to the rearward portion of knot base housing 28 is a knot hook actuating arm 62 (see FIGURE 4) which is pressed always downwardly against knot base member 22 by a spring 64. Knot hook 24 is pivoted to knot base member 22 and has a hooked shank portion 66 which engages a pin 68 in the end of knot hook actuating arm 62. When knot base member 22 is moved forward by the action of cam follower 26, pin 68 engages the shank portion 66 of knot hook 24 and pulls it upward into the attitude as shown in FIGURE 1 and FIGURE 4. In this position in the knot tying process, twine will be wrapped on the knot base member 22 extending beyond threader cam head 36. When knot base member 22 is moved rearwardly by action of cam follower 26, knot hook actuating arm 62 forces the knot hook 24 downwardly so that the knot hook 24 grasps the twine which has been wrapped on knot base member 22 to pull a knot into the twine.

FIGURE 6 discloses the slideably positioned knot base member 22 in knot base housing 28 and further shows the knot hook actuating arm 62 pivoted by pin 70.

FIGURE 7 shows the relative position of the knot base member 22, cam follower 26, groove guide member 54 and guide stop 60.

Groove 38 extends forwardly to open movable jaw 44 to receive twine at the beginning of the knot tying process. Groove 38 may be formed by milling the groove entirely within the threader cam head 36 or the forward part of groove 38 may be provided by forming one side of the groove 38 with a plate 72 (see FIGURES 1, 3 and 4) supported to the front of threader cam head 36 by screws 74.

Figure 8:
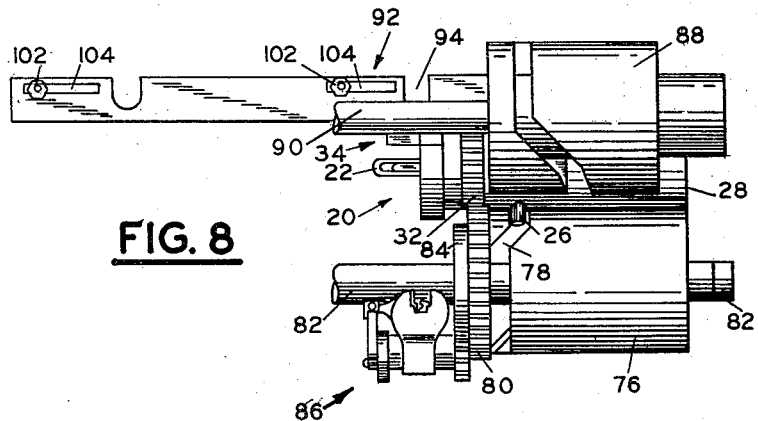
FIGURE 8 is a top view of the knot tying device of this invention showing the conjunctive improved twine holder and twine cutter of this invention.

The relative position of the knot tying device 20 in relation to other elements of the complete knot tying mechanism is best seen in FIGURE 8. This is a top view of a portion of the knot tying mechanism adapted for use on a hay baler. Knot base housing 28 is supported adjacent a knot base cam 76. A cam groove 78 receives cam follower 26 so that the reciprocal motion of knot base member 22 is effected by the cam groove 78.

Affixed to cam 76 is a gear 80 which drives threader gear 32. Shaft 82 which rotates and supports cam 76 and gear 80 is rotated during the knot tying process by mechanical equipment not shown in FIGURE 8. Thus, the rotation of shaft 82 results in the simultaneous and co-ordinated reciprocal actuation of knot base member 22 with the rotation and actuation of threader member 34. A concentric second gear 84 is affixed to the face of gear 80 and actuates a cutter mechanism generally indicated by the numeral 86 which will be described subsequently. A holder cam 88 supported to a shaft 90 is positioned above knot base portion 20 and actuates a twine holder mechanism generally indicated by the numeral 92 which will also be described in greater detail subsequently. The knot tying operation occurs when twine is inserted within notch 94 in twine holder mechanism 92 into the open jaws of the threader member 34 affixed to knot base portion 20 and into cutter member 86.

Operation

Figure 9:
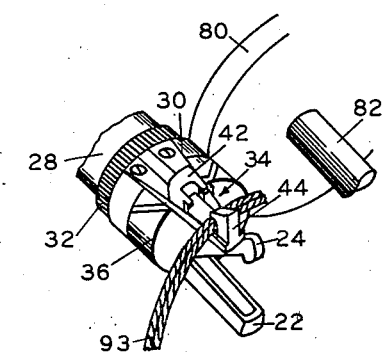
FIGURE 9 through FIGURE 13 shows diagrammatically the various steps in the tying of a knot by the device of this invention.

The knot base portion 20 of the knotter mechanism of this invention is best described by referring to FIGURES 9 through 14. The sequential steps of the tying of a knot according to the principles of this invention are shown. FIGURE 9 shows the mechanism in rest position with movable jaw 44 open, receiving twine 93. Knot hook 24 is at an angle of approximately 45° with respect to knot base member 22.

Figure 10:
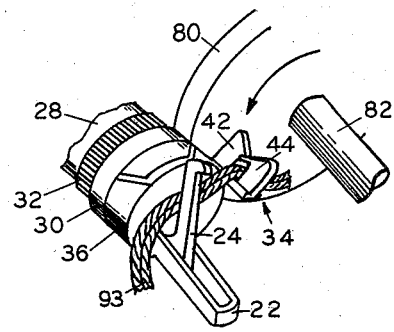
Figure 11:
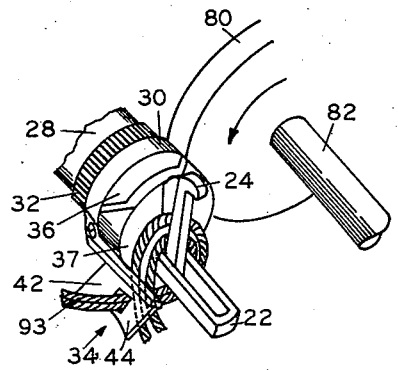
Figure 12:
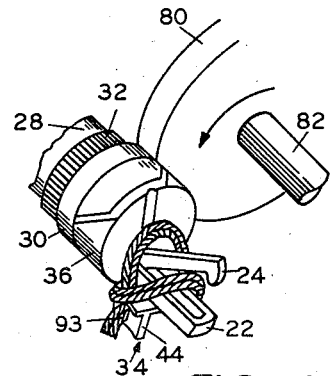
Figure 13:
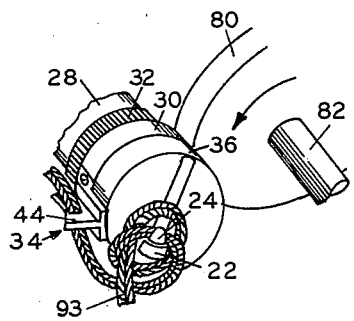
Figure 14:
FIGURE 14 is a view of a knot as tied by the device of this invention.

The first step in the tying process is that threader collar 30 starts rotating so that pin 48 (not seen in FIGURE 9) passes out of groove 38, closing movable jaw 44, loosely grasping twine 93, and laying twine 93 on top of knot hook 24. This is the stage as shown in FIGURE 10. As threader collar 30 continues to rotate, knot base member 22 is moved to the maximum forward position, trapping part of twine 93 between knot hook 24 and the face 37 of threader cam head 36. With the knot base member 22 fully forward, groove guide member 54 will not enter recess groove 52 so that as threader member 34 passes between the positions shown in FIGURE 11 and FIGURE 12, twine 93 will be wrapped on knot base member 22. At the position shown in FIGURE 12, knot base member is starting to withdraw causing knot hook 24 to move downward to grasp the portion of twine 93 wrapped on knot base member 22.

As approximately 700° of rotation of threader collar 30 is being completed, knot hook 24 is completely withdrawn, pulling a knot in twine 93. In traversing from FIGURE 13 to the starting position of FIGURE 9, movable jaw 44 will move forward releasing twine 93 and knot base member 22 will move forward, raising knot hook 24, releasing twine 93 held by it.

The knot formed by the sequential concatenation of elements of the knot tying device is a bow knot which has greatly improved characteristics over other types of knots. The additional fold of twine which forms the core of the knot provides a cushion for the tension bearing portion of the knot so that the knot will support more total tension before the twine immediately adjacent the knot breaks.

Twine Holder

Figure 15:
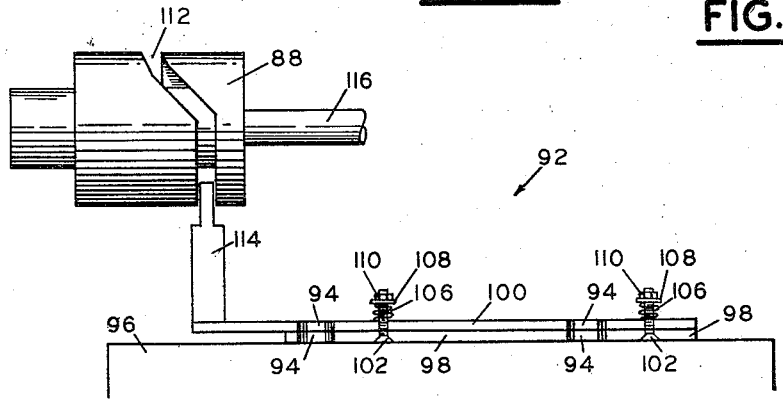
FIGURE 15 is a view of an improved twine holder and holder actuator cam of this invention.

A novel principle of the knot tying mechanism of my invention, as disclosed in my aforementioned co-pending patent application, is the unique step or method of holding the twine so that during the knot tying process the twine will not be under tension which may be exerted by the hay baler. The novel twine holding mechanism of this invention is best shown in FIGURE 8 and FIGURE 15. Referring first to FIGURE 15, a portion of the hay baler to which the knot tying mechanism of this invention is supported is indicated generally by the numeral 96. Supported to hay baler 96 is a first twine holder plate 98. Twine holder plate 98 is a thin, narrow and relatively long metal strip having two notches 94 formed therein in a spaced relationship, best seen in FIGURE 8. Slideably positioned on the upper surface of twine holder plate 98 is upper holder plate 100. Upper holder plate 100 has notches 94 of substantially identical shape to the notches 94 in twine holder plate 98. Bolts 102 extend upwardly through slots 104 in upper plate 100, best seen in FIGURE 8. Springs 106 are placed around bolts 102 and held in position by washers 108 and nuts 110 so that upper plate 100 is resiliently but slideably supported with relation to lower plate 98.

Holder cam 88 is provided with a slot 112 into which a holder follower 114 is received. Holder follower 114 is affixed to upper holder plate 100 so that the rotation of holder cam 88 by holder cam shaft 116 moves upper holder plate 100 relative to lower holder plate 98.

In its rest position, slots 104 of both upper holder plate 100 and lower holder plate 98 are aligned. In the initial step of tying knots in twine to bind a bale of hay, twine is laid into slots 104 at the same time it is laid into proper position relative to the other portions of the tying mechanism. As the tying process is initiated, shaft 116 rotates to slide plate 100 relative to plate 98 by the action of cam 88. Twine which has been placed in the slots 104 will be pinched between the two plates and held immovably so that any force exerted below plate 98 tending to apply tension to the twine while the knot is being formed will be restrained.

Springs 106 may be eliminated if desired since the natural spring effect of plates 98 and 100 may apply sufficient resilient pressure to hold twine trapped therebetween.

The twine holder mechanism 92 of this invention has advantages over existing twine holders in that it is relatively simple, is inexpensive to manufacture, and is practically fail proof in operation and requires no maintenance.

Twine Cutter

Figures 16, 17, 18:
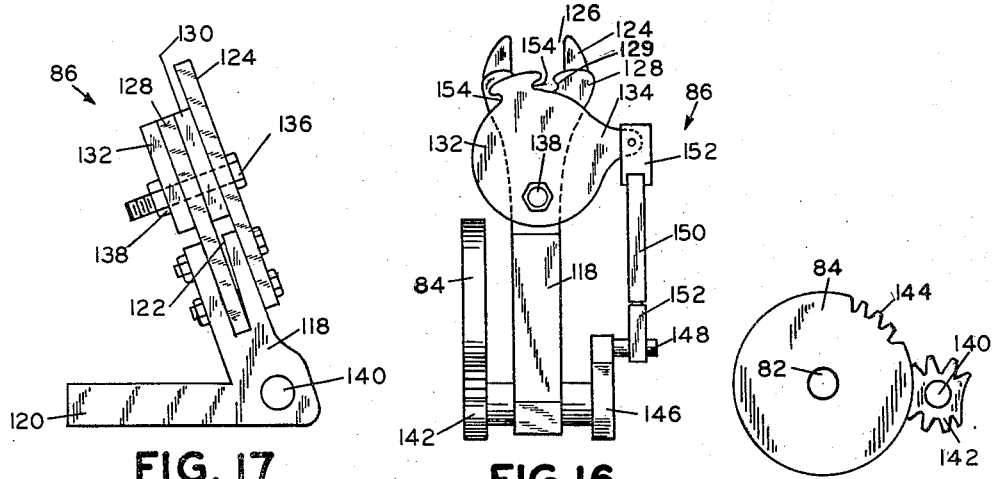
FIGURE 16 is a front view of the improved twine cutter of this invention.
FIGURE 17 is a side view of the improved twine cutter of this invention.
FIGURE 18 is an enlarged view of the actuating gears of the improved twine cutter of this invention.

Each time a knot is tied by a knotting mechanism on a hay baler, the twine must be cut and simultaneously held for the beginning of the formation of a new bale of hay. A new and novel cutter mechanism according to this invention is indicated generally by the numeral 86, and is best shown in FIGURE 16 and FIGURE 17. A cutter body portion 118 is provided with an extending base member 120 integrally formed therewith. A slot 122 is formed in body portion 118. Supported to one side of body portion 118 is a guide member 124 having a slot 126 therein adaptable to guide the twine into proper relationship for the cutting process. Positioned in slot 122 in base member 118 is a cutter stator 128. Cutter stator 128 has a groove 129 formed therein with sharp sides. Positioned between guide member 124 and cutter stator 128 is a holder blade 130. On the back side of cutter stator 128 is a cutter blade 132. Holder blade and cutter blade are of substantially equal configuration and each have integrally formed therewith a lever portion 134 extending outwardly therefrom. A bolt 136 extends through guide member 124, holder blade 130, cutter stator 128 and cutter blade 132. A nut 138 holds these elements in close relationship.

Holder blade 130 and cutter blade 132 pivot about bolt 136.

A shaft 140 extends through body portion 118. One end of shaft 140 is affixed to a gear 142. Gear 142 is adaptable to engage gear 84 which is supported to shaft 82 adjacent gear 80 of the knot base cam 76 (see FIGURE 8). A relatively small segment of gear 84 is provided with teeth 144 (see FIGURE 18), with the balance of the gear 84 being of a consistent diameter substantially equal to the maximum diameter of the teeth. Gear 142 has teeth through an angle slightly in excess of 90° through two portions of its circumference, the portions being opposite of each other. The balance of the circumference of gear 142 is of a recessed area having an arch equivalent to the circumference of gear 84. The relative configuration of gear 84 and gear 142 is such that with each revolution of gear 84, gear 142 rotates shaft 140 through 180° and is otherwise held in an immovable position.

The rotation of shaft 140 through 180° is transmitted to a crank 146 which has a shaft 148 extending therefrom. A connecting link 150 extends from shaft 148 to the integrally formed lever portion 134 of holder plate 130 and cutter blade 132. Pivot joints 152 are provided at each end of connecting link 150 to compensate for angular changes in the actuation of crank 146.

During the knot typing process, shaft 82 is rotated 360° to form a knot. Such rotation, because of the difference in diameters of gear 80 and gear 32, rotates gear 32 720°. Gear 84 is rotated through 360° which, due to the relative configuration of gear 84 and gear 142, rotates shaft 140 180°. This moves crank 146 and crank shaft 148 from a maximum upward to a maximum downward position. On the next knot tying cycle, shaft 148 is moved from maximum downward to the maximum upward position. It will be noted that holder blade 130 and cutter blade 132 are equipped with opposing notches 154. These notches engage the twine which is positioned in slot 126 in guide member 124 and slot 129 in cutter stator 128. In one cycle the twine is engaged in the right side notch 154 and moved to cut the twine with cutter blade 132 and hold the twine with holder blade 130. On the next cycle, when crank 146 is moved in the opposite direction, the left notch 154 of cutter blade 132 and holder blade 130 engages the twine and moves it to cut the twine and simultaneously hold it with holder plate 130.

The novel cutter mechanism of this invention provides a greatly improved means of both cutting and holding the twine and is particularly adaptable for use on a hay baler. The device is relatively simple in operation, is positive in its function to cut the twine, and is not dependent upon speed of movement so that twine is always cut and held properly.

This invention describes improvements in the methods and devices for tying knots, particularly as adapted to the problem of tying knots on hay balers utilizing twine as a means of binding hay.

Although this invention has been described with a certain degree of particularity, it manifests that many changes may be made in the details of construction and arrangement of components without departing from the spirit and scope of this invention.

What is claimed:

1. A device for knotting twine comprising, in combination, a knot base housing; a threader cam head integrally formed at one end of said knot base housing, said threader cam head terminating in a substantially perpendicular face having an opening therein, and said threader cam head having a groove in the periphery thereof; a knot base member reciprocally positioned in said opening in said knot base housing; a knot hook pivotally affixed to said knot base member adaptable to pivot to closed relationship with said knot base member as said knot base member is withdrawn into said knot base housing; a threader member rotatably affixed to said knot base housing, said threader member having a fixed jaw and a movable jaw slideably positioned relative to said fixed jaw; a pin affixed to said movable jaw and extending therefrom into said groove in said threader cam head whereby said movable jaw is opened and closed relative to said fixed jaw by action of said pin in said groove in synchronization with the reciprocal actuation of said knot base member as said threader member is rotated about said knot base housing.

2. A device according to claim 1 including means of maintaining said jaws of said threader member closed during alternate revolution of said threader member about said knot base housing.

3. A device for knotting twine comprising, in combination, a knot base housing; a cylindrical threader cam head integrally formed at one end of said knot base housing, said threader cam head terminating at the forward and rearward end thereof in substantially perpendicular faces, said forward face having a opening therein and said threader cam head having an arcuate groove in a portion of the periphery thereof, said groove communicating at each end thereof with the rearward face of said threader cam head; a knot base member reciprocally positioned in said opening in said knot base housing; a knot hook pivotally affixed to said knot base member adaptable to pivot to closed relationship with said knot base member as said knot base member is withdrawn into said knot base housing; a cylindrical threader collar of substantial equal diameter to said threader cam head rotatably supported to said knot base housing and adaptable to rotate contiguous to said rearward face of said threader cam head and in a plane parallel to the plane of said threader cam head; a fixed jaw member affixed to said threader collar, said fixed jaw member having an opening therein; a movable jaw member slideably positioned in said opening in said fixed jaw member, said jaw members adaptable when positioned in an open position to receive twine therebetween and when in a closed position to loosely grasp said twine and as said threader collar rotates to wrap said twine about said knot base member and said knot hook member; a pin affixed to said movable jaw member extending into said groove in said threader cam head whereby said movable jaw member is positioned by said groove; a groove guide member supported within said knot base housing and slideably movable forwardly and rearwardly and extending when in a forward position into said groove in said threader cam head whereby said pin affixed to said movable jaw is prevented from entering said groove and extending when said groove guide member is in a rearward position into the path of travel of said pin whereby said pin is directed into said groove in said threader cam head; means of reciprocal actuation of said knot base member; means of rotating said threader collar in synchronization with the reciprocal actuation of said knot base member; and means of positioning said groove guide member in synchronization with the reciprocal movement of said knot base member.

4. A device according to claim 3 including spring biasing means resiliently biasing said groove guide member rearwardly and wherein said means of positioning said groove guide member in synchronization with the reciprocal movement of said knot base member includes a guide stop member affixed to and protruding from said knot base member adaptable to engage said groove guide member and move said groove guide member forward into said groove in said threader cam head when knot base member is in its maximum forward position.

5. A device according to claim 3 wherein said threader collar member has an arcuate recess formed in the forward face thereof at the position said fixed jaw member is affixed to said threader collar member whereby said pin affixed to said movable jaw member is positioned in said arcuate recess as said threader collar member rotates except as said groove guide member moves into said recess to force said pin into said groove in said threader cam head.

References Cited in the file of this patent

UNITED STATES PATENTS

| 1,099,128 | Poege | June 2, 1914 |
| 2,716,035 | Thorndike | Aug. 23, 1955 |

FOREIGN PATENTS

| 688,414 | Great Britain | Mar. 4, 1953 |